US010708987B2

(12) United States Patent
Kreiner

(10) Patent No.: US 10,708,987 B2
(45) Date of Patent: Jul. 7, 2020

(54) COOKING APPARATUS FOR TARGETED THERMAL MANAGEMENT

(71) Applicant: AT&T Intellectual Property I, LP, Atlanta, GA (US)

(72) Inventor: Barrett M. Kreiner, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 587 days.

(21) Appl. No.: 14/683,993

(22) Filed: Apr. 10, 2015

(65) Prior Publication Data

US 2016/0302265 A1    Oct. 13, 2016

(51) Int. Cl.
*H05B 6/66* (2006.01)
*H05B 6/64* (2006.01)
(Continued)

(52) U.S. Cl.
CPC ........... *H05B 6/666* (2013.01); *A23L 5/15* (2016.08); *H05B 6/6435* (2013.01);
(Continued)

(58) Field of Classification Search
CPC ..... A23L 5/15; A23L 3/01; A23L 3/26; A23L 3/363; A23L 3/365; A23L 5/01; H05B 2206/044; H05B 6/6435; H05B 6/6447; H05B 6/6455; H05B 6/666; H05B 6/668; H05B 6/686; H05B 6/705; H05B 6/688; H05B 6/687; H05B 6/72; H05B 6/70;
(Continued)

(56) References Cited

U.S. PATENT DOCUMENTS 5,360,965 A * 11/1994 Ishii .................. H05B 6/64
219/685
8,839,527 B2 * 9/2014 Ben-Shmuel ........ D06F 58/266
34/255
(Continued)

FOREIGN PATENT DOCUMENTS

WO    2013078325 A1    5/2013

*Primary Examiner* — Serkan Akar
*Assistant Examiner* — Chris Q Liu
(74) *Attorney, Agent, or Firm* — Guntin & Gust, PLC; Douglas Schnabel

(57) ABSTRACT

Aspects of the subject disclosure may include, for example, a method including detecting, by a controller coupled to an array of elements, an object having a plurality of portions, and analyzing a selected portion to determine its volume and density, to determine parameters of radio frequency thermal excitation for the selected portion. The method also includes selecting radiation emitters from the array elements according to the parameters; each of the array elements is separately selectable and controllable. The method also includes controlling the radiation emitters according to the parameters to perform the thermal excitation of the selected portion. The controlling includes causing interference of waves emitted from separate radiation emitters. The method also includes forming a three-dimensional thermal image of the selected portion, analyzing the thermal image, adjusting the parameters according to the analyzing, and detecting movement into a space irradiated by the radiation emitters. Other embodiments are disclosed.

18 Claims, 13 Drawing Sheets

(51) Int. Cl.
*H05B 6/70* (2006.01)
*H05B 6/68* (2006.01)
*A23L 5/10* (2016.01)

(52) U.S. Cl.
CPC ......... *H05B 6/6447* (2013.01); *H05B 6/6455* (2013.01); *H05B 6/668* (2013.01); *H05B 6/686* (2013.01); *H05B 6/705* (2013.01); *H05B 2206/044* (2013.01); *Y02B 40/146* (2013.01)

(58) Field of Classification Search
CPC ................ H05B 6/6441; H05B 6/6402; H05B 2206/045; H05B 6/645; H05B 6/6464; H05B 6/68; H05B 6/808; H05B 1/02; H05B 6/00; H05B 6/6458; H05B 6/6479; H05B 6/6482; H05B 2206/046; H05B 6/02; H05B 6/50; H05B 6/64; H05B 6/6408; H05B 6/6411; H05B 6/6438; H05B 6/647; H05B 6/6473; H05B 6/6485; H05B 6/6494; H05B 6/664; H05B 6/704; H05B 6/708; H05B 6/725; H05B 6/74; H05B 6/80; Y02B 40/146
USPC ....... 219/705, 711, 709, 745, 730, 720, 729, 219/702, 759, 762, 736, 728, 710, 391, 219/490, 506, 681, 748, 750, 385, 400, 219/438, 492, 635, 678, 679, 685, 696, 219/703, 704, 707, 708, 716, 727, 735, 219/746, 747, 754, 771, 778
See application file for complete search history.

(56) References Cited

U.S. PATENT DOCUMENTS

| | | | |
|---|---|---|---|
| 8,927,913 | B2 | 1/2015 | Hyde et al. |
| 2010/0187224 | A1* | 7/2010 | Hyde ..................... H05B 6/705 219/720 |
| 2012/0241445 | A1 | 9/2012 | Shim et al. |
| 2013/0092680 | A1 | 4/2013 | Cartwright et al. |
| 2013/0142923 | A1 | 6/2013 | Torres et al. |
| 2013/0175262 | A1 | 7/2013 | Gharpurey et al. |
| 2013/0186887 | A1 | 7/2013 | Hallgren et al. |
| 2013/0206749 | A1 | 8/2013 | Libman et al. |
| 2013/0306052 | A1 | 11/2013 | Price et al. |
| 2013/0306626 | A1* | 11/2013 | Torres ................ B65D 81/3446 219/635 |
| 2013/0306627 | A1 | 11/2013 | Libman et al. |
| 2013/0313250 | A1 | 11/2013 | Ibragimov et al. |
| 2014/0203012 | A1* | 7/2014 | Corona ................. H05B 6/686 219/705 |
| 2015/0092055 | A1* | 4/2015 | Scalisi .................. H04N 7/188 348/143 |

* cited by examiner

100

200

300

500

600

700

800

COOKING APPARATUS FOR TARGETED THERMAL MANAGEMENT

FIELD OF THE DISCLOSURE

The subject disclosure relates to a system for applying steerable radio frequency (RF) signals, thermal imaging, RF scanning and RF-based motion detection. More particularly, the subject disclosure relates to improvements in performance, efficiency and safety of microwave cooking.

BACKGROUND

Microwave cooking is typically performed in a closed and shielded space, with the entire volume of the cooking space irradiated by microwaves. Nonuniformities in heating the food item are typically avoided by physically rotating the food inside the cooking space. Materials not compatible with microwaves (e.g. metals) are excluded from the cooking space before cooking begins.

BRIEF DESCRIPTION OF THE DRAWINGS

Reference will now be made to the accompanying drawings, which are not necessarily drawn to scale, and wherein.

DETAILED DESCRIPTION

Figure 1:
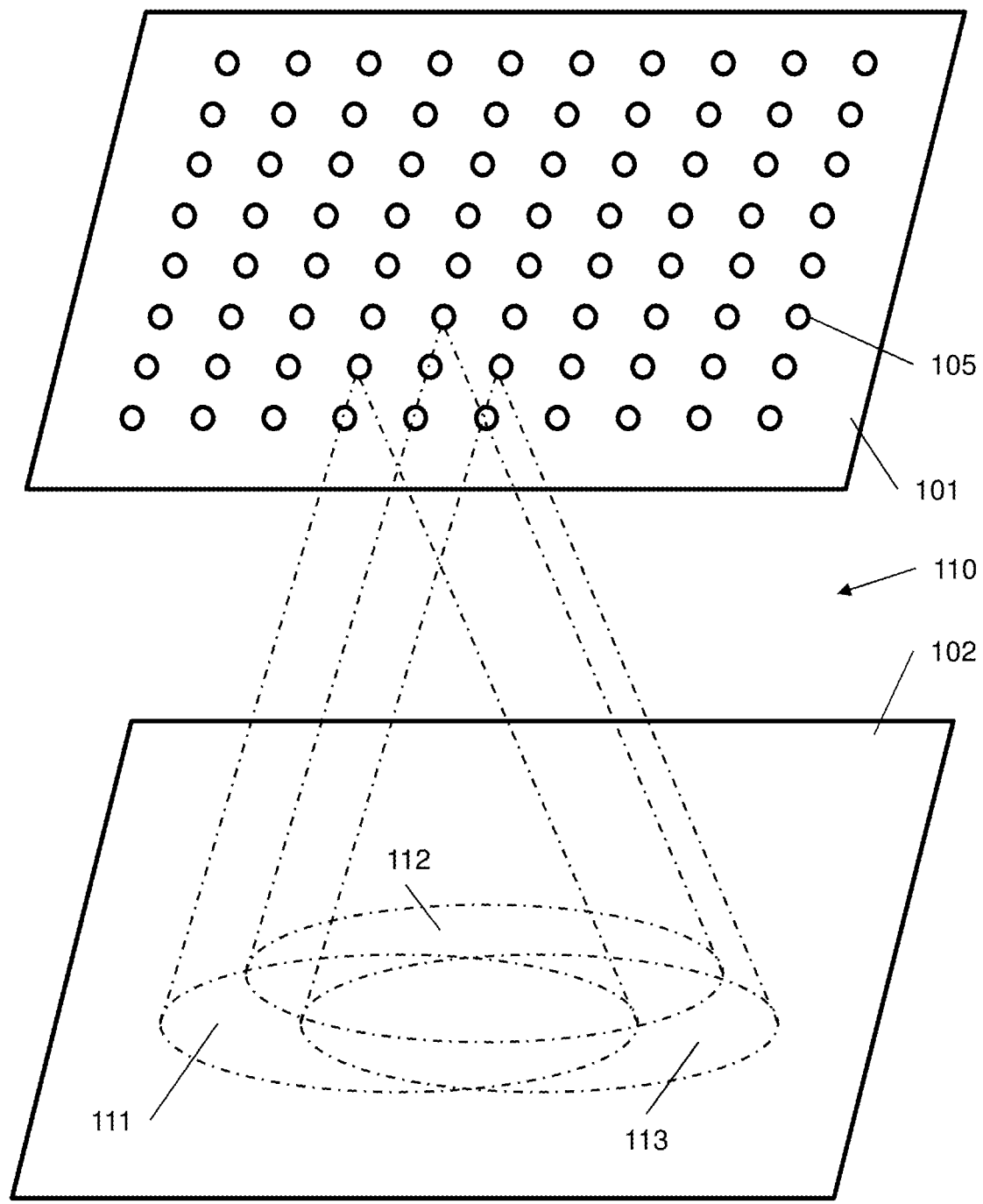
FIG. 1 depicts an arrangement for microwave cooking using steerable RF signals, in accordance with an embodiment of the disclosure.

The subject disclosure describes, among other things, illustrative embodiments for radio frequency (RF) thermal excitation of materials using an array of separately addressable and controllable elements that each include an RF emitter and an RF sensor. In an embodiment of the disclosure, the RF thermal excitation is used in microwave cooking. Other embodiments are described in the subject disclosure.

One or more aspects of the subject disclosure include an array of sources that is used to produce steerable signals, permitting RF energy to be focused on precise locations within an object (e.g. a particular item of food being cooked). Thermal imaging of the object provides feedback to a controller that addresses and controls individual sources, enabling targeted heating of the object.

In an embodiment, an addressable array of microwave sources is used in a microwave cooking appliance (rather than a typical single large magnetron). Different sources may be programmed to emit signals with different strengths and frequencies. Constructive interference of these signals allows energy to be focused on one (or more) predetermined locations within a cooking volume, and tailoring the shape of the heated space. The heated space can conform to the space occupied by the food item, so that the food container is not heated. The array of sources may have a variety of shapes (flat rectangle, flat disk, hemisphere, etc.) for efficiently delivering energy to a defined space.

One embodiment of the subject disclosure includes a device comprising a plurality of radiation emitters disposed in an array, a memory that stores instructions, and a controller coupled to the array and to the memory. The controller, responsive to executing the instructions, performs operations. The operations comprise detecting an object having a plurality of portions, and analyzing a selected portion of the plurality of portions to determine a volume and a density thereof, thereby determining parameters of radio frequency thermal excitation for the selected portion. The operations also comprise selecting radiation emitters from the array in accordance with the determined parameters; each of the plurality of radiation emitters comprises a separate radio frequency generating element and is separately selectable and controllable. The operations further comprise controlling the selected radiation emitters in accordance with the determined parameters to perform the radio frequency thermal excitation of the selected portion; the controlling comprises causing interference of waves emitted from separate radiation emitters of the selected radiation emitters. The operations also comprise detecting thermal signals to form a three-dimensional thermal image of the selected portion, analyzing the thermal image, adjusting the parameters in accordance with the analyzing, detecting movement into a space irradiated by the selected radiation emitters, and discontinuing the radio frequency thermal excitation in response to the detected movement.

One embodiment of the subject disclosure includes a device comprising a plurality of array elements; each array element comprises a radio frequency emitter, a radio frequency detector, and a thermal imaging sensor. Each array element is individually addressable and controllable by a controller. The controller thereby detects an object in a space having an outer boundary, a portion of which is formed by the plurality of array elements, and controls radio frequency emitters of selected array elements to perform radio frequency thermal excitation of a selected portion of the object by causing interference of waves emitted from the respective radio frequency emitters. The controller also obtains a thermal image of the selected portion via the thermal imaging sensors of the array elements, adjusts the radio frequency thermal excitation in accordance with the thermal image, and detects intrusion into the space while the radio frequency thermal excitation is performed.

One embodiment of the subject disclosure includes a method comprising detecting, by a controller coupled to an array of elements, an object having a plurality of portions, and analyzing a selected portion of the plurality of portions to determine a volume and a density thereof, thereby determining parameters of radio frequency thermal excitation for the selected portion. The method also comprises selecting radiation emitters from the array elements in accordance with the determined parameters; each of the array elements is separately selectable and controllable. The method further comprises controlling the selected radiation emitters in accordance with the determined parameters to perform the radio frequency thermal excitation of the selected portion; the controlling comprises causing interference of waves emitted from separate radiation emitters of the selected radiation emitters. The method also comprises forming a three-dimensional thermal image of the selected portion, analyzing the thermal image, adjusting the parameters in accordance with the analyzing, and detecting movement into a space irradiated by the selected radiation emitters.

FIG. 1 is a schematic perspective view of an illustrative embodiment of an arrangement 100 for microwave cooking using steerable RF signals. In this embodiment, a rectangular array 101 of elements 105 is positioned above a cooking surface 102; each array element includes a separate RF source. The space 110 between array 101 and surface 102 forms a cooking volume (that is, a space that can be irradiated with RF energy from one or more of the RF sources). Each of the array elements 105 is individually addressable and controllable; accordingly, different RF sources may be programmed to emit signals with different strengths and frequencies. Constructive interference of these signals allows energy to be focused on one (or more) predetermined locations within the cooking volume, to tailor the shape of the heated space.

In the example shown in FIG. 1, three RF sources in array 101 deliver RF energy in overlapping volumes 111, 112, 113 respectively. Depending on the relative frequencies and RF power emitted by the different sources, different locations in volumes 111, 112, 113 will be heated at different rates. This enables targeted RF thermal excitation (spot heating) of a material, so that only specific parts of the volume are heated. A food item placed on surface 102 and inside cooking volume 110 therefore can receive RF energy in a space matching its own dimensions, so that the food item can be cooked while other locations inside cooking volume 110 are not heated.

In this embodiment, array 101 is shown as a planar rectangle. However, the array of sources may have any of a variety of shapes (disk, hemisphere, etc.) for efficiently delivering energy to a defined space.

Figure 2:
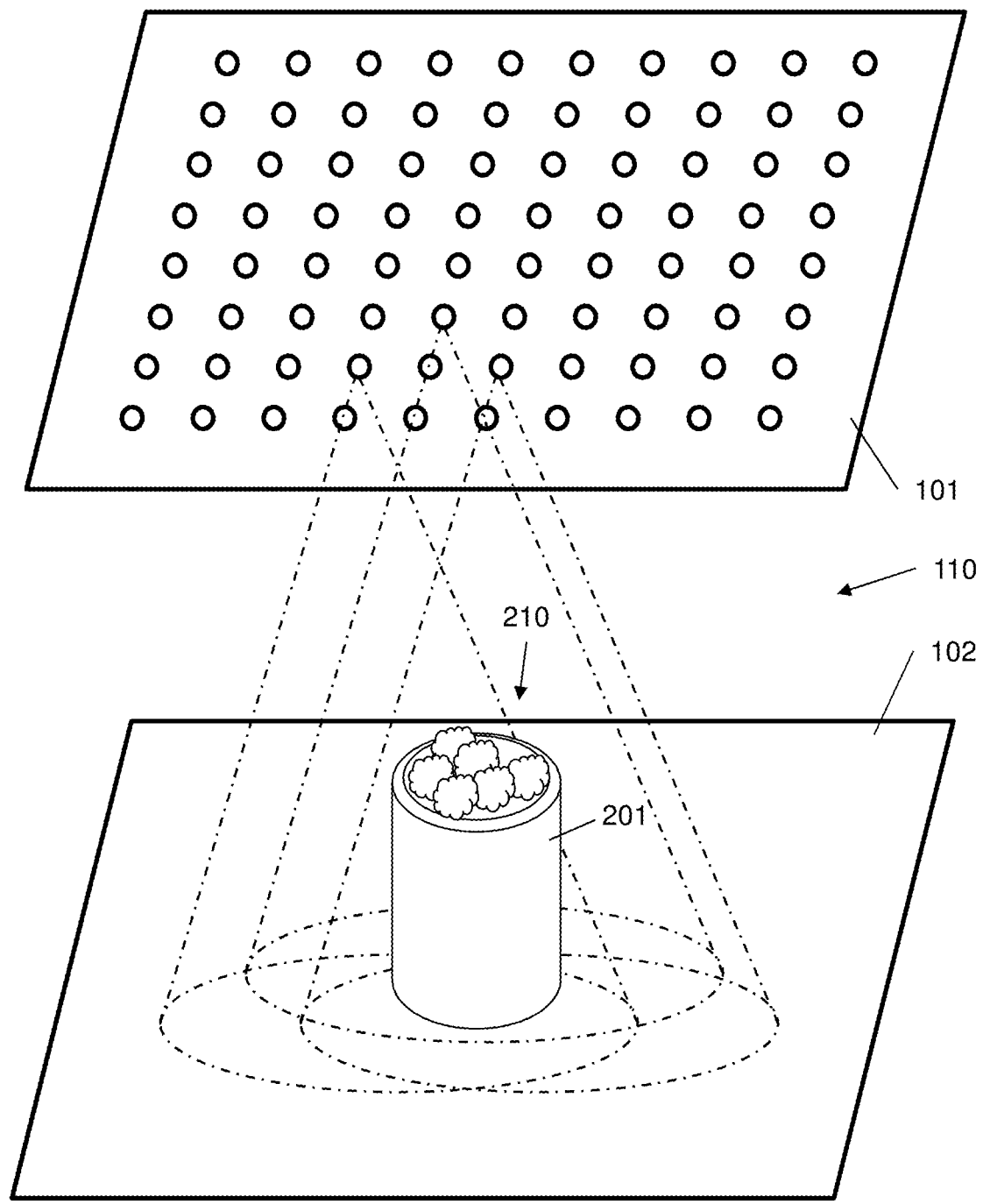
FIG. 2 depicts microwave cooking of a food portion in a container, in accordance with an embodiment of the disclosure.

FIG. 2 schematically depicts a system 200 for microwave cooking of a food portion 210 in a container 201, in accordance with an embodiment of the disclosure. In this embodiment, RF scanning is used to detect both container 201 and food portion 210, and to determine the densities of the different materials in the cooking volume 110. In this embodiment, each array element 105 includes an RF sensor to locate the target volume and determine the density of the target volume, and thus determine the energy required to bring the target to the desired temperature. The density sensor can distinguish between an item of food to be cooked and the container for that item; the RF energy can be steered to the food and not the container.

Figure 3:
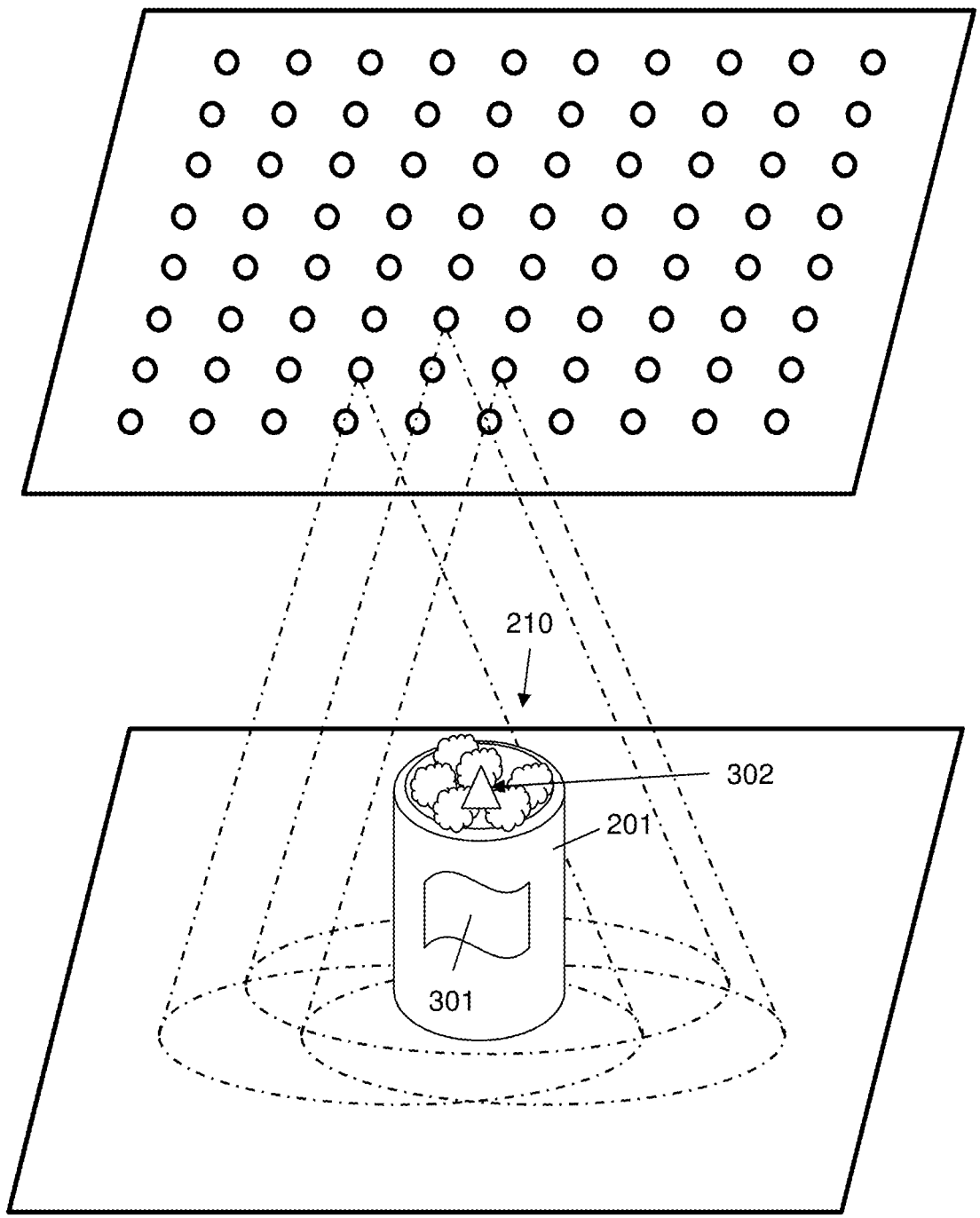
FIG. 3 depicts microwave cooking of a food portion in a container where the container and the food portion have an incompatible material therein, in accordance with an embodiment of the disclosure.

FIG. 3 schematically illustrates an arrangement 300 for microwave cooking of a food portion in a container according to an embodiment of the disclosure, where the container 201 includes a metal portion 301 and the food portion 210 has metal object 302 embedded therein. (Metals generally are examples of materials incompatible with microwaves.) As shown in FIG. 2, RF energy from the RF sources of array elements 105 can be steered to heat the food portion and to avoid the container, so that metal portion 301 located on, or in, container 201 is not irradiated. Since metals generally have a higher density than foods, the density sensors of array elements 105 can locate metal object 302 within the food portion 210, so that the RF sources can be adjusted to avoid irradiating the metal object.

In an embodiment, each array element 105 also includes an infrared sensor, so that the temperature at specific locations of the volume being heated can be determined Rapid heating at a particular location in the cooking volume can indicate presence of an incompatible material. The sensors of the array elements can thus distinguish the shape and volume of the incompatible material; the RF sources can be adjusted to avoid irradiating that volume.

Figure 4:
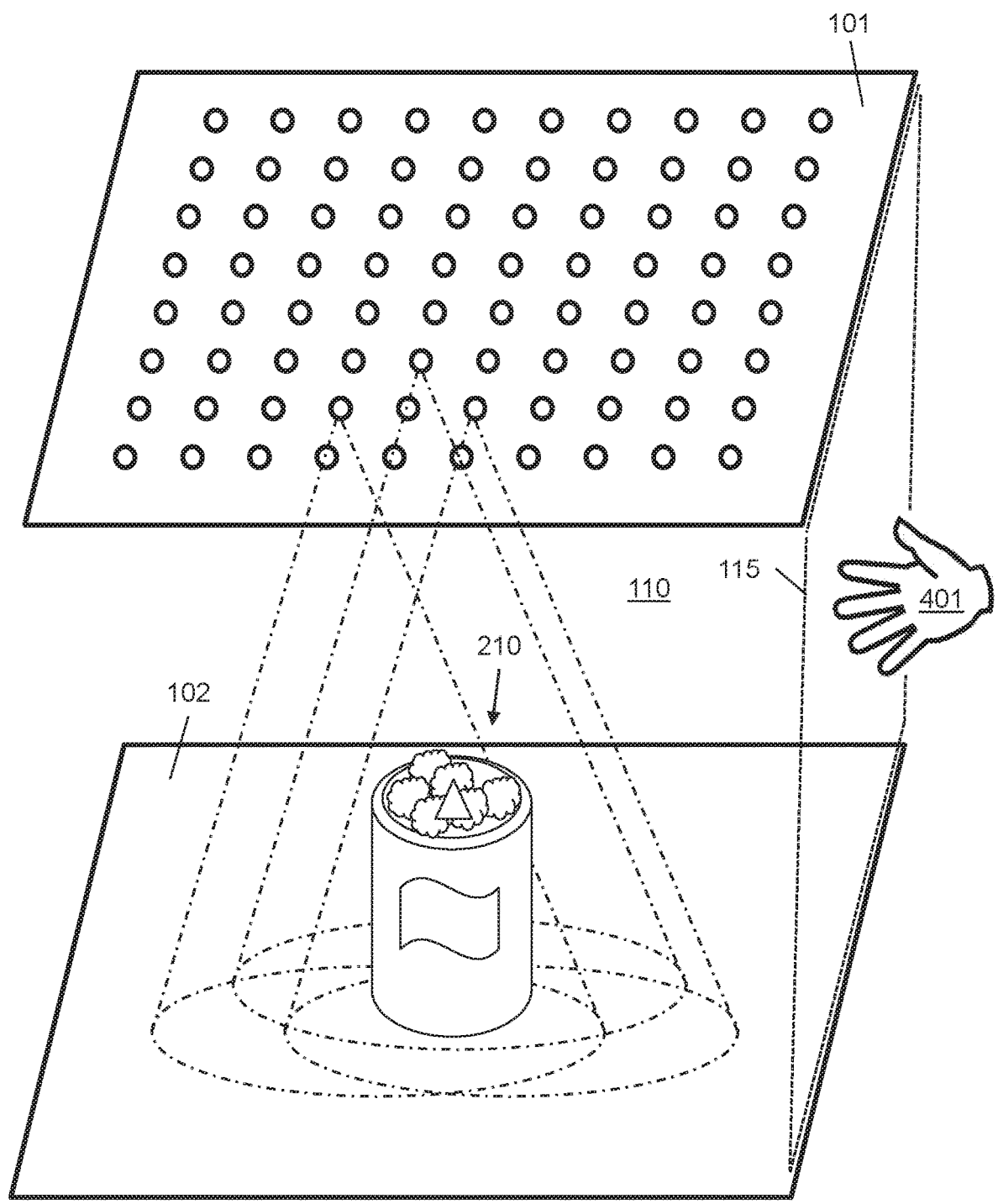
FIG. 4 depicts detection and avoidance of intrusion into the microwave cooking space of FIGS. 1-3, in accordance with an embodiment of the disclosure.

It will be appreciated that cooking volume 110 is defined by the size of array 101 and corresponding surface 102, and is not bounded by walls (thus providing "open air" microwave cooking; that is, the volume 110 is open to the ambient). FIG. 4 schematically illustrates a system 400 for microwave cooking according to an embodiment of the disclosure, in which the system can detect and respond to intrusions into the cooking volume 110. In this embodiment, the elements 105 of array 101 include RF sources and sensors, and can detect motion within cooking volume 110 by sensing Doppler shifts in the frequencies of reflected signals. An object in motion near the boundary of the cooking volume 110 (e.g. a user's hand 401 reaching in through portion 115 of the boundary) is thus detected as an intrusion. In an embodiment, the RF power is turned off upon detection of an intrusion. In another embodiment, the system can adapt to the intrusion by sensing the location and shape of the intruding object and steering the RF signals to avoid the intruding object.

Heating of the food portion 210 may result in some movement of the food material. In an embodiment, the system can distinguish between intruding motion (e.g. an object moving within the outer 0.5 cm of the cooking volume) and motion caused by the cooking process.

Figure 5:
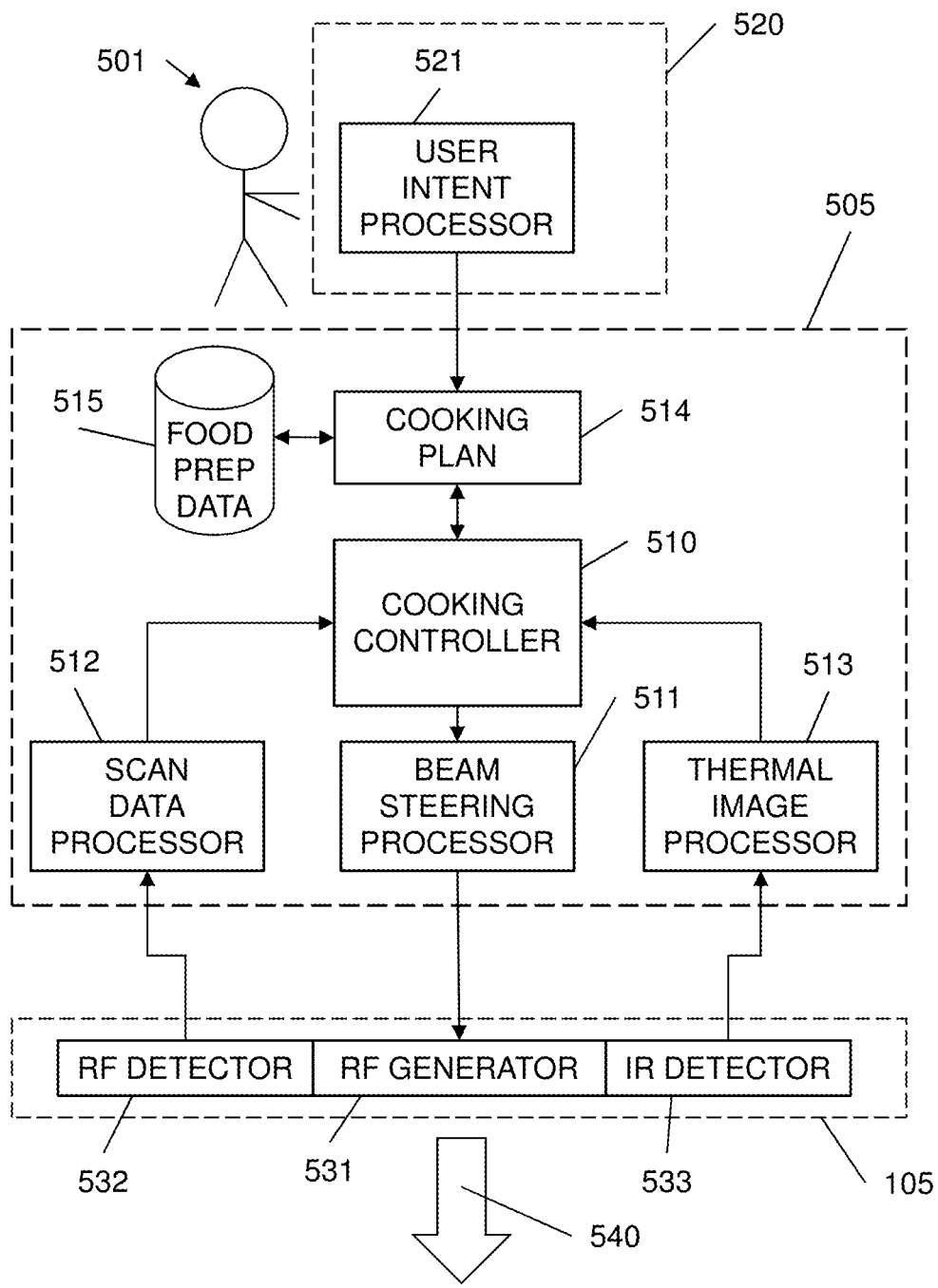
FIG. 5 schematically illustrates a system for applying steerable RF signals, thermal imaging, and RF scanning in the microwave cooking space of FIGS. 1-4, in accordance with an embodiment of the disclosure.

FIG. 5 schematically illustrates a system 500 for controlling microwave heating of objects in accordance with an embodiment of the disclosure. In this embodiment, the elements 105 of array 101 are controlled by array controller 505. Array controller 505 receives input from user 501 via user interaction device 520, which may include a keypad, microphone, touchscreen or the like to enable user input. In this embodiment, device 520 includes user intent processor 521 to translate the user's intent into the basis of a cooking plan 514. Additional information for formulating the cooking plan is obtained from a food preparation database 515.

The cooking plan is further developed and refined by cooking controller 510, based on data from database 515 and RF scanning and thermal imaging data regarding the location, shape, density and temperature of the food portion. For example, if the user simply keys or says the word "boil" and the RF scanning determines that water having a volume of 500 ml is present at a certain location, the database 515 adds to the cooking plan by specifying a target temperature of 100° C. If the thermal imaging determines that the target material (water in this instance) is already at a temperature of 30° C., the cooking plan is updated to specify delivery of 35 Kcal of energy to the particular portion of the cooking volume occupied by the water. The cooking plan indicates where the steerable RF signal is to be applied, at what power level, and for how long.

Cooking controller 510 implements the cooking plan by controlling the power, frequency and timing of RF signals emitted from selected array elements 105. In this embodiment, cooking controller 510 directs beam steering processor 511 to activate the RF generators 531 in the selected array elements 105. Processor 511 can cause the RF generators 531 of different array elements to emit RF energy at different frequencies, so that constructive interference between the RF signals enables targeted delivery of the RF energy.

In this embodiment, array controller 505 also includes a processor 512 for receiving and processing RF scanning data from detector 532 of array element 105. The cooking controller 510 uses the scanning data to locate the food portion and determine its shape, volume and density. The cooking controller can then update the cooking plan and select array elements whose RF generators are to be activated by the beam steering processor 511.

In this embodiment, array controller 505 also includes a processor 513 for receiving and processing thermal image data from infrared detector 533 of array element 105. The cooking controller 510 uses the thermal image data to determine the RF energy required to reach the target temperature. During the cooking process, the thermal image can be updated and compared with the cooking plan for various locations within the food portion. If, for example, the updated thermal image of the food portion shows that a location is being undercooked, the cooking controller can modify the cooking plan to provide for additional spot heating at that location.

In general, the RF scanning data and thermal image data are obtained from sets of array elements 105 that may be different from the set of array elements selected to irradiate the food portion.

It will be appreciated that the cooking controller 510 builds and implements cooking plan 514 by directing beam steering processor 511, and also receives feedback regarding the cooking process via scan data processor 512 and thermal image processor 513. Since the RF scanning data and thermal imaging data are received from a plurality of array elements, the cooking controller 510 can obtain a three-dimensional image of the food portion.

Figure 6:
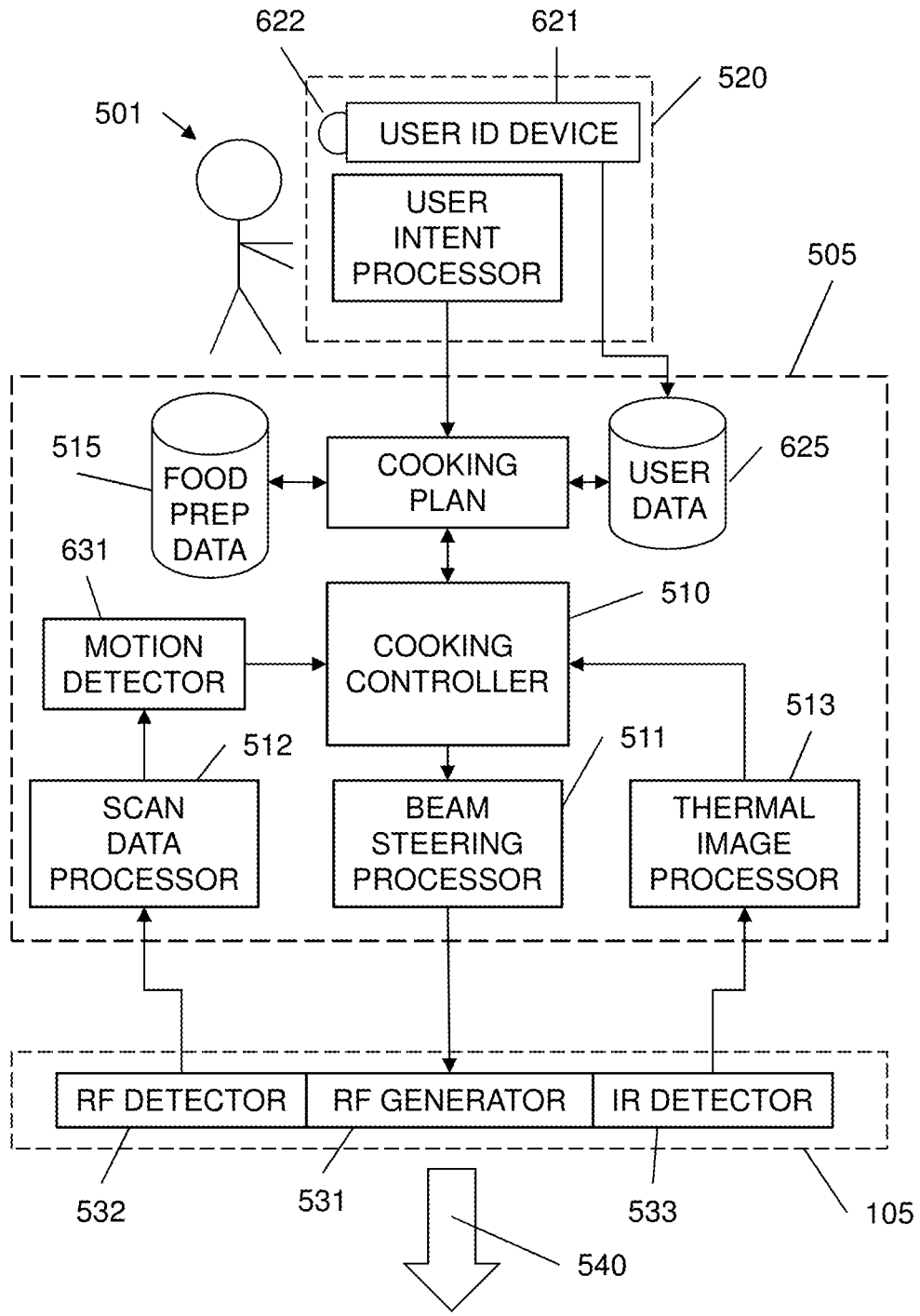
FIG. 6 schematically illustrates a system for applying RF-based motion detection in the microwave cooking space of FIGS. 1-4, in accordance with an embodiment of the disclosure.

FIG. 6 schematically illustrates features of a microwave cooking system 600 according to an embodiment of the disclosure. System 600 includes a motion detector 631; in this embodiment, motion detector 631 uses frequency shifts in the RF scanning data to detect intrusion into the cooking volume. Intrusion into the cooking volume is determined based on motion in the outer portion of the cooking volume (see FIG. 4), rather than motion in the volume being heated.

In an embodiment, the user interaction device 520 can include a user identification device 621. User identification device 621 can include a camera 622 for obtaining an image of the user, which can then be compared with user profiles in database 625. The cooking controller can then identify particular user needs or safety issues, based on the user profile. For example, the device 621 may identify the user 501 as a child, whose user profile specifies that food should be heated to not more than 45° C. The cooking controller 510 can then modify the cooking plan accordingly.

Figure 7:
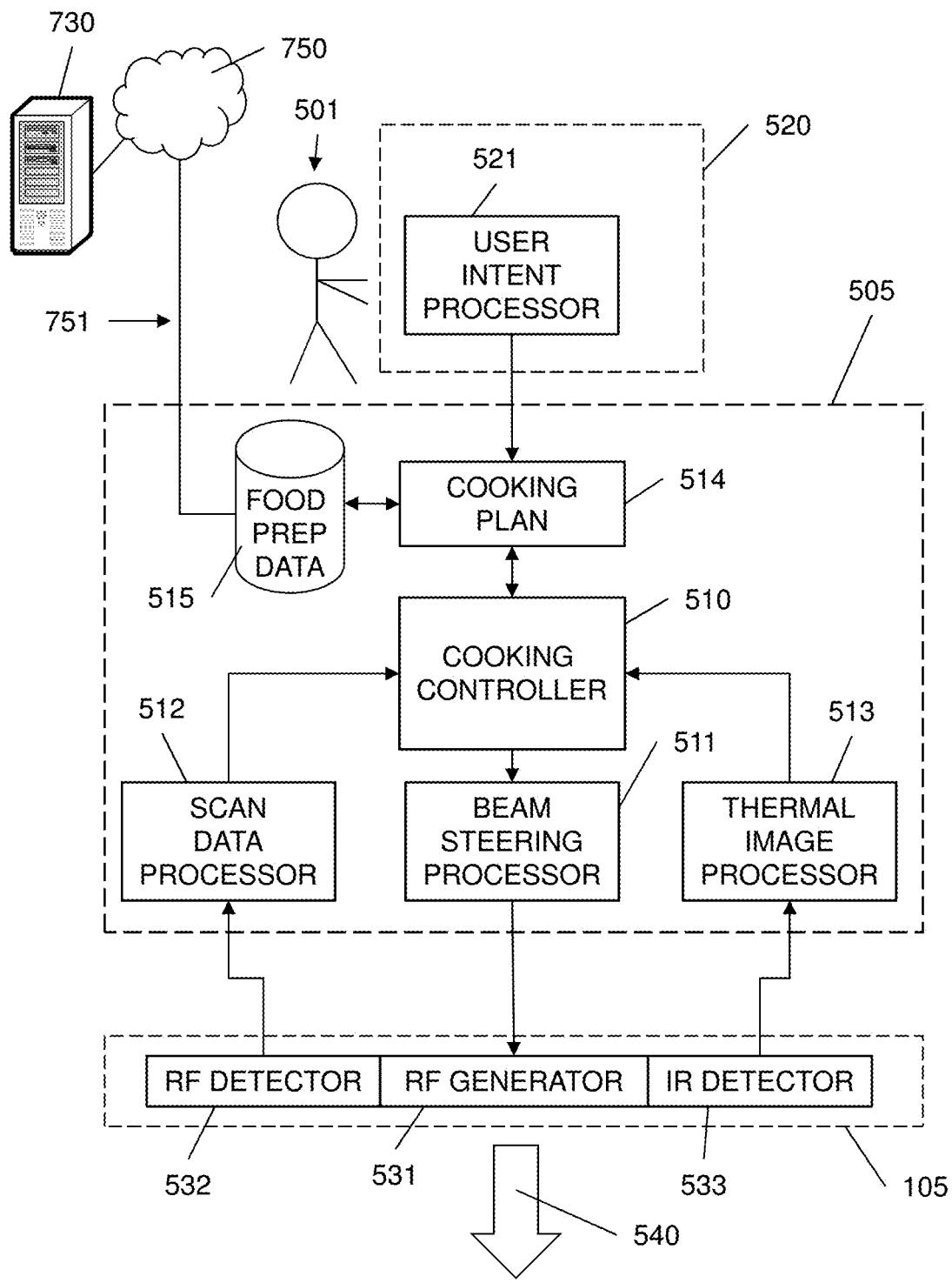
FIG. 7 schematically illustrates a system for using online food preparation resources to facilitate intent-based microwave cooking, in accordance with an embodiment of the disclosure.

FIG. 7 schematically illustrates a system 700 for using online food preparation resources to facilitate intent-based microwave cooking, in accordance with an embodiment of the disclosure. In this embodiment, controller 505 is connected to a network 750 (e.g. the Internet) by a link 751, enabling system 700 to obtain detailed food preparation data from a remote server 730. For example, user 501 can place an unfamiliar food item in the cooking volume and simply say "cook." The cooking controller 510 can determine the density and volume of the food from the RF scanning data, and determine the starting temperature from the thermal image data. Based on this data, and in response to a query of server 730 via network 750, the food preparation database 515 can be updated with detailed information regarding the type of food and how it should be heated. It will be appreciated that, by building and executing cooking plan 514 using food preparation database 515, the cooking controller 510 can obtain the result intended by the user, without the user having to estimate power levels or heating times.

In another embodiment, the user interaction device 520 includes an Internet-capable communication device so that the user can search and obtain relevant food preparation data from server 730.

Figure 8:
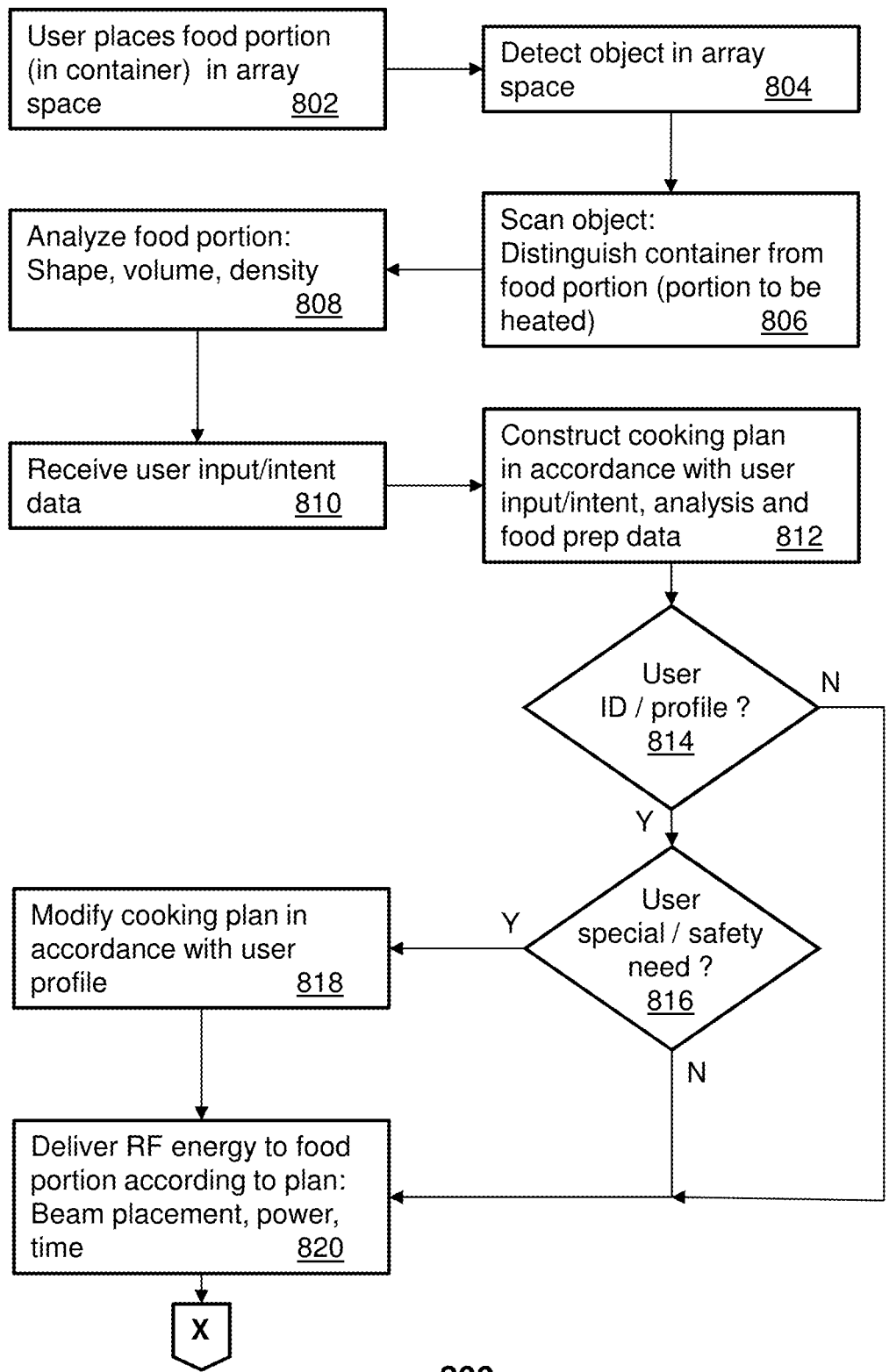
FIGS. 8-9 are connected flowcharts depicting an illustrative embodiment of a method used in portions of the systems described in FIGS. 5-7.
Figure 9:
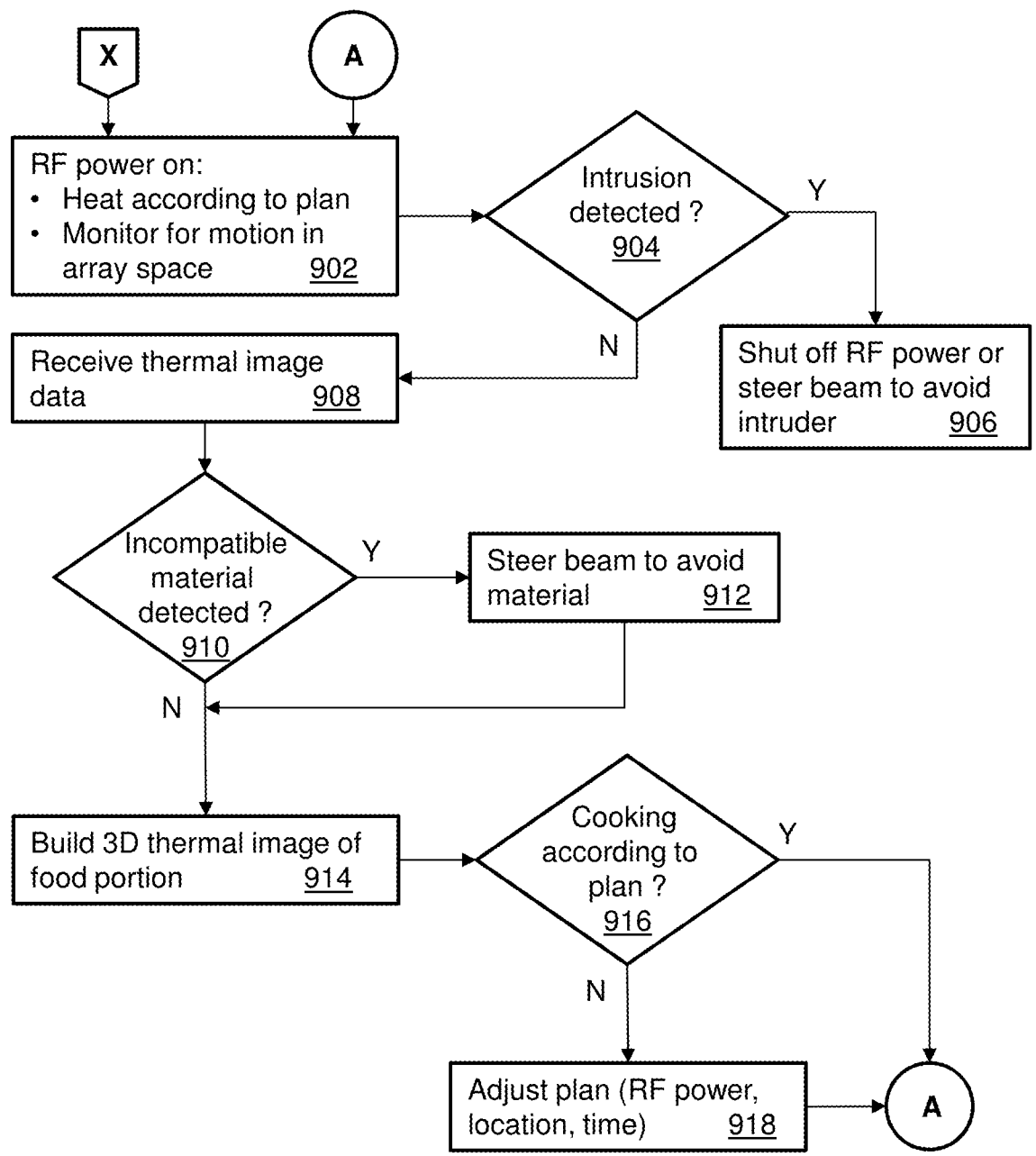

FIGS. 8-9 are connected flowcharts depicting an illustrative embodiment of a method 800-900 used in portions of the systems 500-700 described in FIGS. 5-7. The cooking process begins with the user placing an object (a food portion, with or without a container) in the cooking volume (step 802). In these embodiments, the cooking volume is the space 110 between the array 101 of generator/sensor elements and surface 102. The sensors of the array detect the object in the cooking volume (step 804), and then distinguish the food portion from the container (step 804). The food portion is then analyzed (step 808) to determine its shape, volume and density.

The system receives user input (step 810) indicating the user's intent; in this embodiment, the user does not specify an RF power level or cooking time. The system (in these embodiments, the cooking controller 510) constructs a cooking plan based on the user's intent, the analysis of the food portion, and the food preparation database (step 812). In an embodiment, the system can determine whether the user has a user profile (step 814). If the user is identified and has a profile, the system can then determine from the profile (step 816) whether the user has a special need or safety issue that should be included in the cooking plan; if so, the system modifies the cooking plan in accordance with the profile (step 818). Otherwise, the system proceeds to deliver RF energy to the food portion according to the cooking plan (step 820). In these embodiments, the array controller 505 selects array elements to deliver RF signals at specific frequencies and power levels for specific time periods, thereby providing targeted heating of the food portion with steered RF signals.

The RF sensors and thermal imaging sensors of the array elements provide feedback to the cooking controller during the cooking process. The RF sensors also monitor the cooking volume for motion indicating an intrusion into the cooking volume (step 902). If an intrusion is detected (step 904), the RF power is either shut off (step 906), or alternatively can be steered around the intruding object.

The cooking controller receives thermal imaging data from the array elements (step 908), and determines whether an incompatible material is present (step 910). If so, the controller uses the thermal imaging data to locate the incompatible material and then steer the RF signals to avoid that material (step 912). The system can then build a three-dimensional thermal image of the food portion (step 914), and use that image to evaluate the progress of the cooking process relative to the cooking plan. If the cooking is not progressing according to the plan (step 916), the system adjusts the plan (step 918), for example by directing spot heating for locations that have not reached the planned temperature. This comparison with the cooking plan, using feedback from the RF scanning and thermal imaging sensors, continues (steps 918 to 902) until the cooking process is complete.

Figure 10:
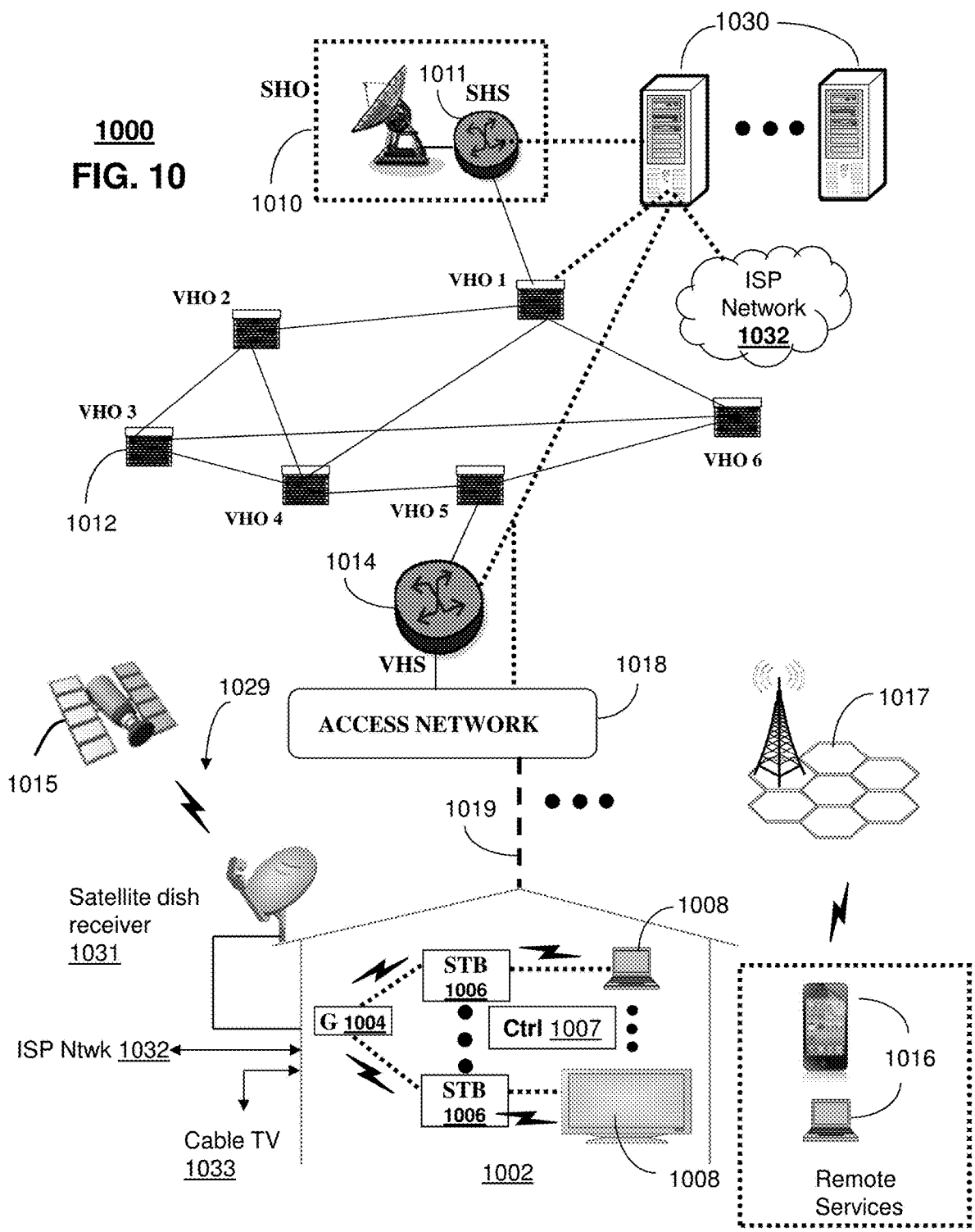
FIGS. 10-11 depict illustrative embodiments of communication systems that provide media services.

FIG. 10 depicts an illustrative embodiment of a first communication system 1000 for delivering media content. The communication system 1000 can represent an Internet Protocol Television (IPTV) media system. Communication system 1000 can be overlaid or operably coupled with the systems of FIGS. 5-7 as another representative embodiment of communication system 1000. For instance, one or more devices illustrated in the communication system 1000 of FIG. 10 can be a controller coupled to a memory that stores instructions and coupled to a plurality of radiation emitters disposed in an array. The controller, responsive to executing the instructions, can perform operations comprising detecting an object having a plurality of portions, and analyzing a selected portion of the plurality of portions to determine a volume and a density thereof, thereby determining parameters of radio frequency thermal excitation for the selected portion. The operations can also comprise selecting radiation emitters from the array in accordance with the determined parameters, where each of the plurality of radiation emitters comprises a separate radio frequency generating element and is separately selectable and controllable. The operations can further comprise controlling the selected radiation emitters in accordance with the determined parameters to perform the radio frequency thermal excitation of the selected portion; the controlling can comprise causing interference of waves emitted from separate radiation emitters of the selected radiation emitters. The operations can also comprise detecting thermal signals to form a three-dimensional thermal image of the selected portion, analyzing the thermal image, adjusting the parameters in accordance with the analyzing, detecting movement into a space irradiated by the selected radiation emitters, and discontinuing the radio frequency thermal excitation in response to the detected movement.

The IPTV media system can include a super head-end office (SHO) 1010 with at least one super headend office server (SHS) 1011 which receives media content from satellite and/or terrestrial communication systems. In the present context, media content can represent, for example, audio content, moving image content such as 2D or 3D videos, video games, virtual reality content, still image content, and combinations thereof. The SHS server 1011 can forward packets associated with the media content to one or more video head-end servers (VHS) 1014 via a network of video head-end offices (VHO) 1012 according to a multicast communication protocol.

The VHS 1014 can distribute multimedia broadcast content via an access network 1018 to commercial and/or residential buildings 1002 housing a gateway 1004 (such as a residential or commercial gateway). The access network 1018 can represent a group of digital subscriber line access multiplexers (DSLAMs) located in a central office or a service area interface that provide broadband services over fiber optical links or copper twisted pairs 1019 to buildings 1002. The gateway 1004 can use communication technology to distribute broadcast signals to media processors 1006 such as Set-Top Boxes (STBs) which in turn present broadcast channels to media devices 1008 such as computers or television sets managed in some instances by a media controller 1007 (such as an infrared or RF remote controller).

The gateway 1004, the media processors 1006, and media devices 1008 can utilize tethered communication technologies (such as coaxial, powerline or phone line wiring) or can operate over a wireless access protocol such as Wireless Fidelity (WiFi), Bluetooth®, Zigbee® or other present or next generation local or personal area wireless network technologies. By way of these interfaces, unicast communications can also be invoked between the media processors 1006 and subsystems of the IPTV media system for services such as video-on-demand (VoD), browsing an electronic programming guide (EPG), or other infrastructure services.

A satellite broadcast television system 1029 can be used in the media system of FIG. 10. The satellite broadcast television system can be overlaid, operably coupled with, or replace the IPTV system as another representative embodiment of communication system 1000. In this embodiment, signals transmitted by a satellite 1015 that include media content can be received by a satellite dish receiver 1031 coupled to the building 1002. Modulated signals received by the satellite dish receiver 1031 can be transferred to the media processors 1006 for demodulating, decoding, encoding, and/or distributing broadcast channels to the media devices 1008. The media processors 1006 can be equipped with a broadband port to an Internet Service Provider (ISP) network 1032 to enable interactive services such as VoD and EPG as described above.

In yet another embodiment, an analog or digital cable broadcast distribution system such as cable TV system 1033 can be overlaid, operably coupled with, or replace the IPTV system and/or the satellite TV system as another representative embodiment of communication system 1000. In this embodiment, the cable TV system 1033 can also provide Internet, telephony, and interactive media services. System 1000 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 1030, a portion of which can operate as a web server for providing web portal services over the ISP network 1032 to wireline media devices 1008 or wireless communication devices 1016.

Communication system 1000 can also provide for all or a portion of the computing devices 1030 to function as a server (herein referred to as server 1030). The server 1030 can use computing and communication technology to provide food preparation data to array controller 505, which can include among other things, functions performed by remote server 730 of FIG. 7. Furthermore, server 1030 can communicate with array controller 505 to perform functions described for cooking controller 510 of FIGS. 5-7. The media processors 1006 and wireless communication devices 1016 can be provisioned with software functions to utilize the services of server 1030.

Figure 11:
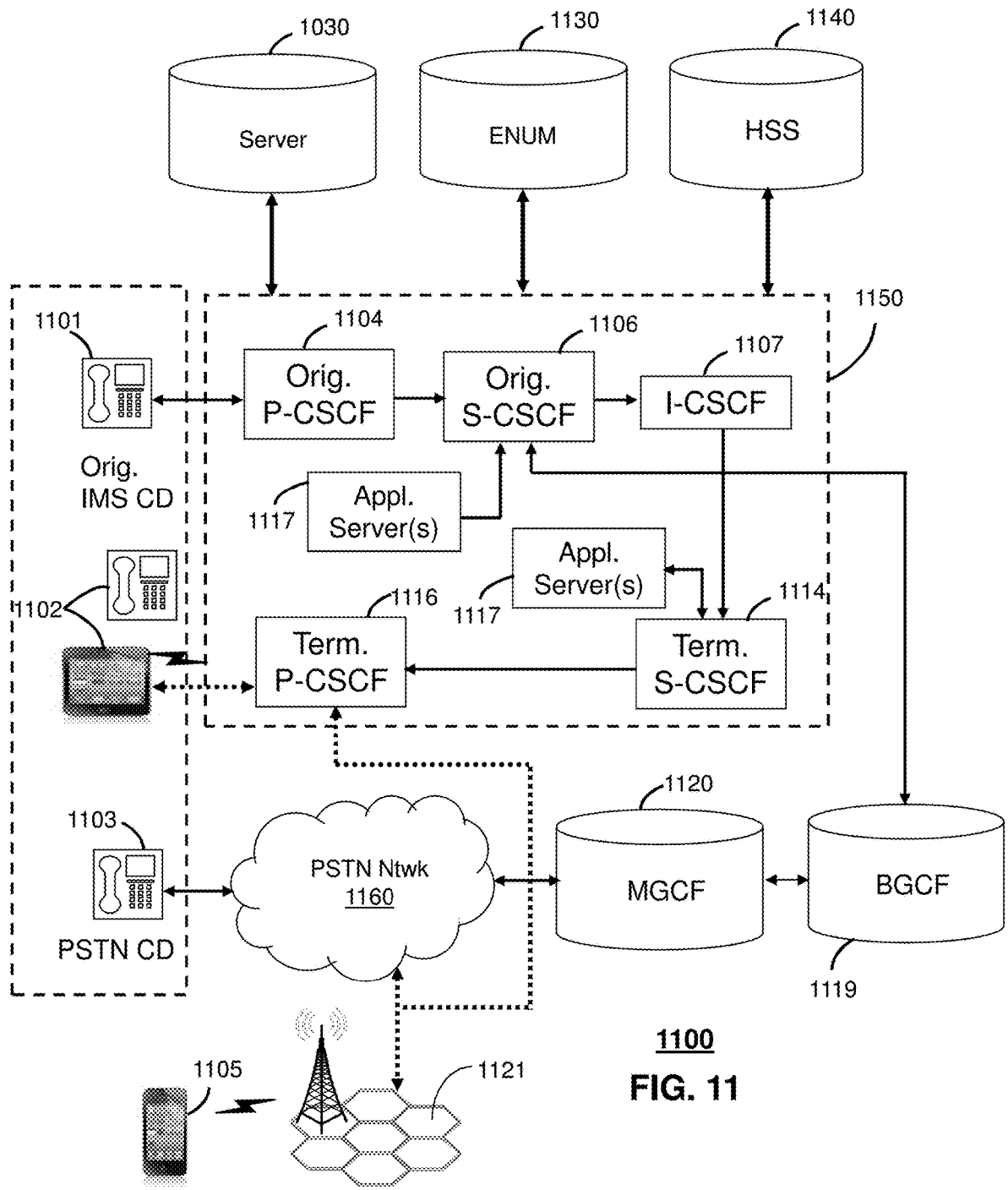

Multiple forms of media services can be offered to media devices over landline technologies such as those described above. Additionally, media services can be offered to media devices by way of a wireless access base station 1017 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. FIG. 11 depicts an illustrative embodiment of a communication system 1100 employing an IP Multimedia Subsystem (IMS) network architecture to facilitate the combined services of circuit-switched and packet-switched systems. Communication system 1100 can be overlaid or operably coupled with communication system 1000 as another representative embodiment of communication system 1000. For example, system 1100 can communicate with a device that comprises a plurality of array elements, each array element including a radio frequency emitter, a radio frequency detector, and a thermal imaging sensor. Each array element is individually addressable and controllable by a controller. The controller thereby detects an object in a space having an outer boundary, a portion of which is formed by the plurality of array elements, and controls radio frequency emitters of selected array elements to perform radio frequency thermal excitation of a selected portion of the object by causing interference of waves emitted from the respective radio frequency emitters. The controller also obtains a thermal image of the selected portion via the thermal imaging sensors of the array elements, adjusts the radio frequency thermal excitation in accordance with the thermal image, and detects intrusion into the space while the radio frequency thermal excitation is performed.

Communication system 1100 can comprise a Home Subscriber Server (HSS) 1140, a tElephone NUmber Mapping (ENUM) server 1130, and other network elements of an IMS network 1150. The IMS network 1150 can establish communications between IMS-compliant communication devices (CDs) 1101, 1102, Public Switched Telephone Network (PSTN) CDs 1103, 1105, and combinations thereof by way of a Media Gateway Control Function (MGCF) 1120 coupled to a PSTN network 1160. The MGCF 1120 need not be used when a communication session involves IMS CD to IMS CD communications. A communication session involving at least one PSTN CD may utilize the MGCF 1120.

IMS CDs 1101, 1102 can register with the IMS network 1150 by contacting a Proxy Call Session Control Function (P-CSCF) which communicates with an interrogating CSCF (I-CSCF), which in turn, communicates with a Serving CSCF (S-CSCF) to register the CDs with the HSS 1140. To initiate a communication session between CDs, an originating IMS CD 1101 can submit a Session Initiation Protocol (SIP INVITE) message to an originating P-CSCF 1104 which communicates with a corresponding originating S-CSCF 1106. The originating S-CSCF 1106 can submit the SIP INVITE message to one or more application servers (ASs) 1117 that can provide a variety of services to IMS subscribers.

For example, the application servers 1117 can be used to perform originating call feature treatment functions on the calling party number received by the originating S-CSCF 1106 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1106 can submit queries to the ENUM system 1130 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1107 to submit a query to the HSS 1140 to identify a terminating S-CSCF 1114 associated with a terminating IMS CD such as reference 1102. Once identified, the I-CSCF 1107 can submit the SIP INVITE message to the terminating S-CSCF 1114. The terminating S-CSCF 1114 can then identify a terminating P-CSCF 1116 associated with the terminating CD 1102. The P-CSCF 1116 may then signal the CD 1102 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 11 may be interchangeable. It is further noted that communication system 1100 can be adapted to support video conferencing. In addition, communication system 1100 can be adapted to provide the IMS CDs 1101, 1102 with the multimedia and Internet services of communication system 1000 of FIG. 10.

If the terminating communication device is instead a PSTN CD such as CD 1103 or CD 1105 (in instances where the cellular phone only supports circuit-switched voice communications), the ENUM system 1130 can respond with an unsuccessful address resolution which can cause the originating S-CSCF 1106 to forward the call to the MGCF 1120 via a Breakout Gateway Control Function (BGCF) 1119. The MGCF 1120 can then initiate the call to the terminating PSTN CD over the PSTN network 1160 to enable the calling and called parties to engage in voice and/or data communications.

It is further appreciated that the CDs of FIG. 11 can operate as wireline or wireless devices. For example, the CDs of FIG. 11 can be communicatively coupled to a cellular base station 1121, a femtocell, a WiFi router, a Digital Enhanced Cordless Telecommunications (DECT) base unit, or another suitable wireless access unit to establish communications with the IMS network 1150 of FIG. 11. The cellular access base station 1121 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 11.

Cellular phones supporting LTE can support packet-switched voice and packet-switched data communications and thus may operate as IMS-compliant mobile devices. In this embodiment, the cellular base station 1121 may communicate directly with the IMS network 1150 as shown by the arrow connecting the cellular base station 1121 and the P-CSCF 1116.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 1030 of FIG. 10 can be operably coupled to communication system 1100 for purposes similar to those described above. Server 1030 can perform provide services to the CDs 1101, 1102, 1103 and 1105 of FIG. 11. CDs 1101, 1102, 1103 and 1105 can be adapted with software to utilize the services of the server 1030. Server 1030 can be an integral part of the application server(s) 1117, which can be adapted to the operations of the IMS network 1150.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 12:
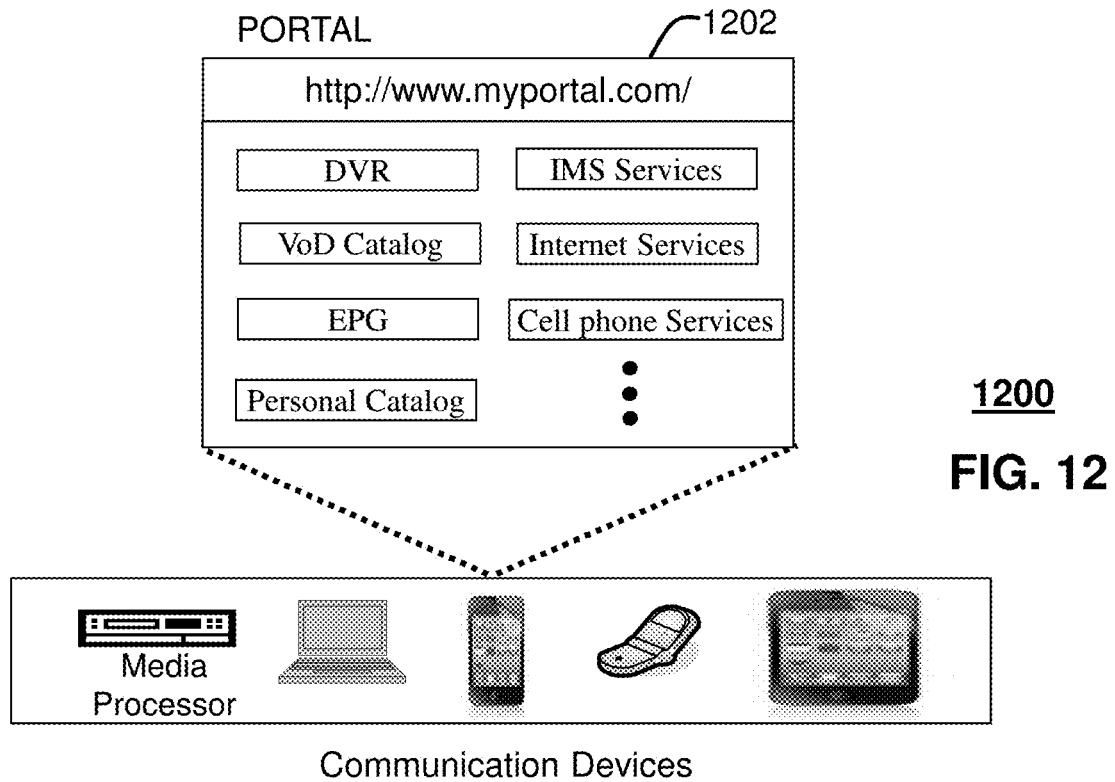
FIG. 12 depicts an illustrative embodiment of a web portal for interacting with the communication systems of FIGS. 10-11.

FIG. 12 depicts an illustrative embodiment of a web portal 1202 of a communication system 600. Communication system 600 can be overlaid or operably coupled with communication system 1000, and/or communication system 1100 as another representative embodiment of system 700 of FIG. 7, communication system 1000, and/or communication system 1100. The web portal 1202 can be used for managing services of communication systems 1000-1100. A web page of the web portal 1202 can be accessed by a Uniform Resource Locator (URL) with an Internet browser using an Internet-capable communication device such as those described in and FIGS. 10-11. The web portal 1202 can be configured, for example, to access a media processor 1006 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1006. The web portal 1202 can also be used for provisioning IMS services described earlier, provisioning Internet services, provisioning cellular phone services.

The web portal 1202 can further be utilized to manage and provision software applications and to adapt these applications as may be desired by subscribers and/or service providers of communication systems 1000-1100. For instance, users of the services provided by server 730 or server 1030 (e.g. user 501) can log into their on-line accounts and provision the server 730 or server 1030 with user profiles and/or special food preparation requirements or safety requirements to be added to the cooking plan 514. Service providers can log onto an administrator account to provision, monitor and/or maintain server 1030.

Figure 13:
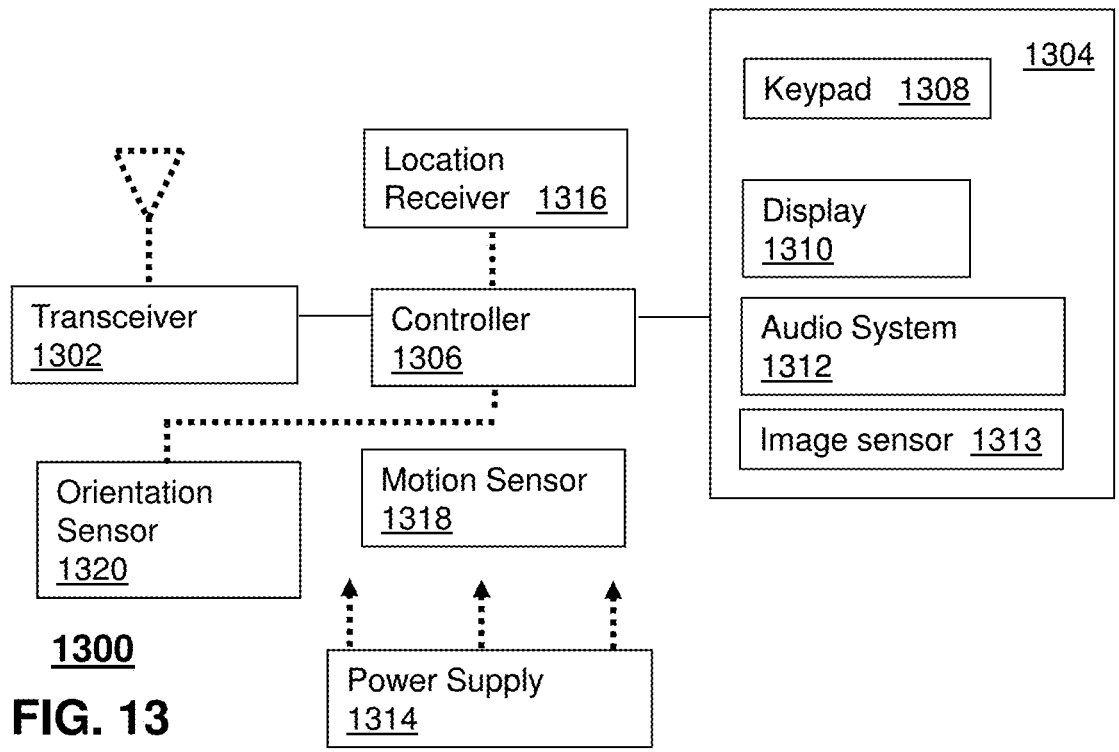
FIG. 13 depicts an illustrative embodiment of a communication device.

FIG. 13 depicts an illustrative embodiment of a communication device 1300. Communication device 1300 can serve in whole or in part as an illustrative embodiment of the devices depicted in FIGS. 10-11 and can be configured to perform portions of method 800-900 of FIGS. 8-9.

Communication device 1300 can comprise a wireline and/or wireless transceiver 1302 (herein transceiver 702), a user interface (UI) 1304, a power supply 1314, a location receiver 1316, a motion sensor 1318, an orientation sensor 1320, and a controller 1306 for managing operations thereof. The transceiver 1302 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1302 can also be adapted to support circuit-switched wireline access technologies (such as PSTN), packet-switched wireline access technologies (such as TCP/IP, VoIP, etc.), and combinations thereof.

The UI 1304 can include a depressible or touch-sensitive keypad 1308 with a navigation mechanism such as a roller ball, a joystick, a mouse, or a navigation disk for manipulating operations of the communication device 1300. The keypad 1308 can be an integral part of a housing assembly of the communication device 1300 or an independent device operably coupled thereto by a tethered wireline interface (such as a USB cable) or a wireless interface supporting for example Bluetooth®. The keypad 1308 can represent a numeric keypad commonly used by phones, and/or a QWERTY keypad with alphanumeric keys. The UI 1304 can further include a display 1310 such as monochrome or color LCD (Liquid Crystal Display), OLED (Organic Light Emitting Diode) or other suitable display technology for conveying images to an end user of the communication device 1300. In an embodiment where the display 1310 is touch-sensitive, a portion or all of the keypad 1308 can be presented by way of the display 1310 with navigation features.

The display 1310 can use touch screen technology to also serve as a user interface for detecting user input. As a touch screen display, the communication device 1300 can be adapted to present a user interface with graphical user interface (GUI) elements that can be selected by a user with a touch of a finger. The touch screen display 1310 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1310 can be an integral part of the housing assembly of the communication device 1300 or an independent device communicatively coupled thereto by a tethered wireline interface (such as a cable) or a wireless interface.

The UI 1304 can also include an audio system 1312 that utilizes audio technology for conveying low volume audio (such as audio heard in proximity of a human ear) and high volume audio (such as speakerphone for hands free operation). The audio system 1312 can further include a microphone for receiving audible signals of an end user. The audio system 1312 can also be used for voice recognition applications. The UI 1304 can further include an image sensor 1313 such as a charged coupled device (CCD) camera for capturing still or moving images.

The power supply 1314 can utilize common power management technologies such as replaceable and rechargeable batteries, supply regulation technologies, and/or charging system technologies for supplying energy to the components of the communication device 1300 to facilitate long-range or short-range portable applications. Alternatively, or in combination, the charging system can utilize external power sources such as DC power supplied over a physical interface such as a USB port or other suitable tethering technologies.

The location receiver 1316 can utilize location technology such as a global positioning system (GPS) receiver capable of assisted GPS for identifying a location of the communication device 1300 based on signals generated by a constellation of GPS satellites, which can be used for facilitating location services such as navigation. The motion sensor 1318 can utilize motion sensing technology such as an accelerometer, a gyroscope, or other suitable motion sensing technology to detect motion of the communication device 1300 in three-dimensional space. The orientation sensor 1320 can utilize orientation sensing technology such as a magnetometer to detect the orientation of the communication device 1300 (north, south, west, and east, as well as combined orientations in degrees, minutes, or other suitable orientation metrics).

The communication device 1300 can use the transceiver 1302 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1306 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1300.

Other components not shown in FIG. 13 can be used in one or more embodiments of the subject disclosure. For instance, the communication device 1300 can include a reset button (not shown). The reset button can be used to reset the controller 1306 of the communication device 1300. In yet another embodiment, the communication device 1300 can also include a factory default setting button positioned, for example, below a small hole in a housing assembly of the communication device 1300 to force the communication device 1300 to re-establish factory settings. In this embodiment, a user can use a protruding object such as a pen or paper clip tip to reach into the hole and depress the default setting button. The communication device 1300 can also include a slot for adding or removing an identity module such as a Subscriber Identity Module (SIM) card. SIM cards can be used for identifying subscriber services, executing programs, storing subscriber data, and so forth.

The communication device 1300 as described herein can operate with more or less of the circuit components shown in FIG. 13. These variant embodiments can be used in one or more embodiments of the subject disclosure.

The communication device 1300 can be adapted to perform the functions of the media processor 1006, the media devices 1008, or the portable communication devices 1016 of FIG. 10, as well as the IMS CDs 1101-1102 and PSTN CDs 1103-1105 of FIG. 11. It will be appreciated that the communication device 1300 can also represent other devices that can operate in communication systems 1000-1100 of FIGS. 10-11 such as a gaming console and a media player.

Upon reviewing the aforementioned embodiments, it would be evident to an artisan with ordinary skill in the art that said embodiments can be modified, reduced, or enhanced without departing from the scope of the claims described below. For example, a user 501 can communicate with user interaction device 520 via a mobile communication device, in order to control cooking from a remote location. The user can also use a mobile communication device to obtain food preparation data and transmit that data to database 515. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 14:
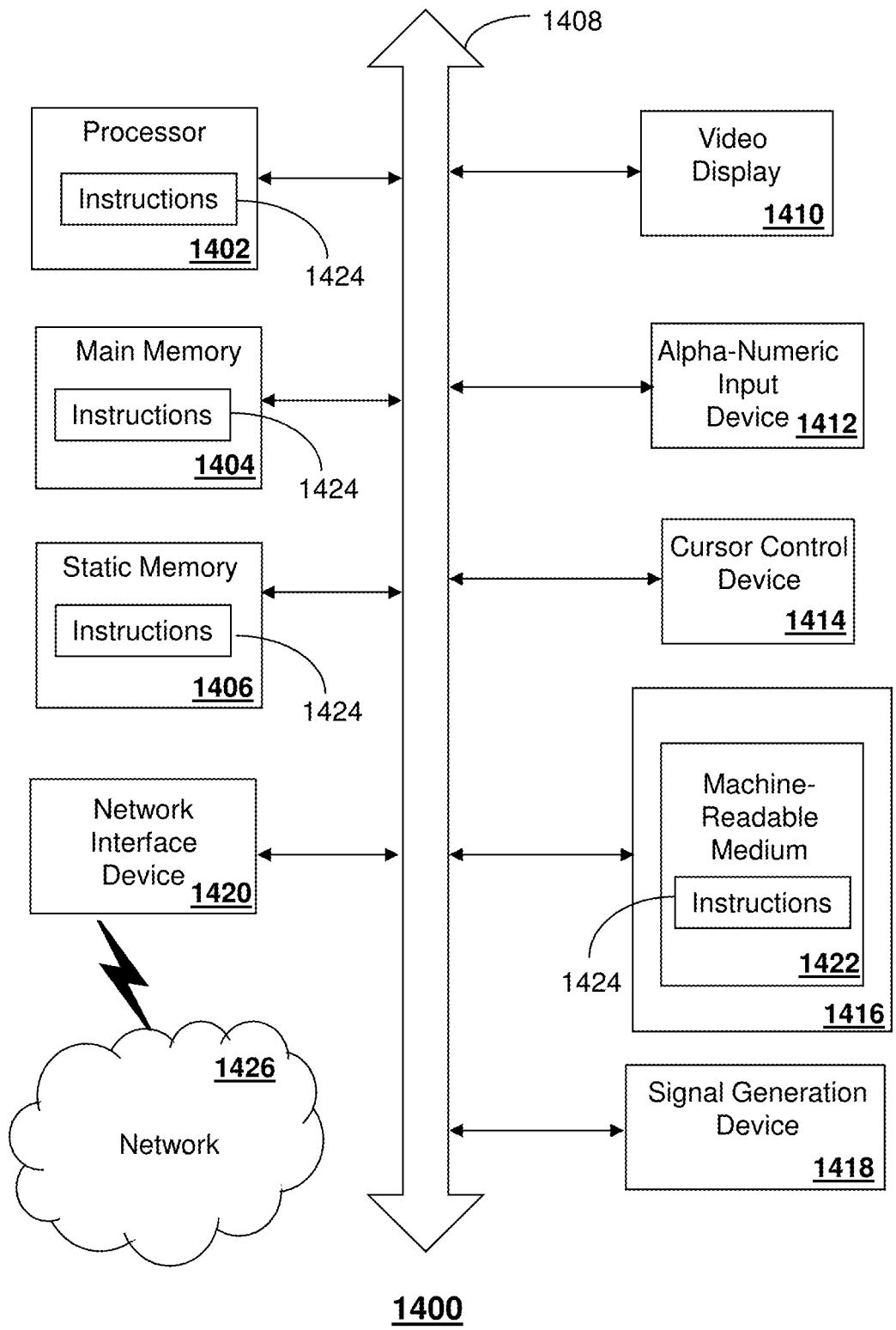
FIG. 14 is a diagrammatic representation of a machine in the form of a computer system within which a set of instructions, when executed, may cause the machine to perform any one or more of the methods described herein.

FIG. 14 depicts an exemplary diagrammatic representation of a machine in the form of a computer system 1400 within which a set of instructions, when executed, may cause the machine to perform any one or more of the methods described above. One or more instances of the machine can operate, for example, as the server 730, the server 1030, or the array controller 505. In some embodiments, the machine may be connected (e.g., using a network 1426) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor (or controller) 1402 (e.g., a central processing unit (CPU)), a graphics processing unit (GPU, or both), a main memory 1404 and a static memory 1406, which communicate with each other via a bus 1408. The computer system 1400 may further include a display unit 1410 (e.g., a liquid crystal display (LCD), a flat panel, or a solid state display). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420. In distributed environments, the embodiments described in the subject disclosure can be adapted to utilize multiple display units 1410 controlled by two or more computer systems 1400. In this configuration, presentations described by the subject disclosure may in part be shown in a first of the display units 1410, while the remaining portion is presented in a second of the display units 1410.

The disk drive unit 1416 may include a tangible computer-readable storage medium 1422 on which is stored one or more sets of instructions (e.g., software 1424) embodying any one or more of the methods or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A cooking device comprising:
a plurality of radiation emitters, a plurality of radio frequency sensors, and a plurality of infrared sensors disposed in an array;
a beam steering processor;
a memory that stores instructions; and
a cooking controller coupled to the array, the beam steering processor, and to the memory, wherein the cooking controller circuit executes the instructions to facilitate:
obtaining first scanning data generated by the plurality of radio frequency sensors;
analyzing the first scanning data generated by the plurality of radio frequency sensors to determine a location of a first object in a cooking volume defined by the array and a cooking surface opposite the array;
analyzing the first scanning data to determine a volume and density of a selected portion of the first object;
determining an energy required to bring the selected portion of the first object to a target temperature according to the volume and density that is determined;
determining emitter parameters of radio frequency thermal excitation for the selected portion according to the energy required;
selecting a set of radiation emitters of the plurality of radiation emitters from the array in accordance with the emitter parameters, wherein each of the plurality of radiation emitters is separately selectable and controllable;
directing the beam steering processor to control the set of radiation emitters in accordance with the emitter parameters to perform the radio frequency thermal excitation of the selected portion, wherein the control comprises causing interference of waves emitted from separate radiation emitters of the set of radiation emitters, wherein the first object comprises a container portion for containing the selected portion, and wherein the control of the set of radiation emitters further comprises avoiding radio frequency thermal excitation of the container portion;
obtaining thermal signals generated by the plurality of infrared sensors;
analyzing thermal signals generated by the plurality of infrared sensors to form a three-dimensional thermal image of the selected portion;
comparing the thermal image and a cooking plan;
adjusting the emitter parameters in accordance with comparing the thermal image and the cooking plan;
analyzing second scanning data generated by the plurality of radio frequency sensors to detect a second object in motion near a boundary of the cooking volume irradiated by the set of radiation emitters such that the cooking volume is open to intrusion; and
directing the beam steering processor to steer around the second object in response to detecting the second object.

2. The cooking device of claim 1, wherein the cooking controller further facilitates detecting whether the first object is incompatible with radio frequency thermal excitation.

3. The cooking device of claim 2, wherein the plurality of radiation emitters is controlled to avoid irradiation of the first object.

4. The cooking device of claim 3, wherein the first object further comprises a metal.

5. The cooking device of claim 1, wherein the cooking controller further facilitates:
determining the target temperature for the selected portion;
determining from a user profile whether a user has a special need or safety issue; and
modifying the cooking plan according to the special need or safety issue.

6. The cooking device of claim 1, wherein the emitter parameters comprise a radiation frequency, an emitted power, and a radiation time for each of the set of radiation emitters.

7. The cooking device of claim 1, wherein the cooking controller further facilitates detecting movement of the second object by sensing a Doppler shift in a frequency of a reflected signal, the movement corresponding to an intrusion into the cooking volume.

8. The cooking device of claim 1, wherein the cooking controller further facilitates:
receiving input from a user regarding the radio frequency thermal excitation; and
identifying the user, wherein the parameters are adjusted in accordance with an identity of the user.

9. A cooking device comprising:
a cooking controller;
a beam steering processor; and
an array including a plurality of array elements each comprising:
 a radio frequency emitter;
 a radio frequency detector; and
 a thermal imaging sensor;
wherein each array element is individually addressable and controllable by the cooking controller, wherein the cooking controller executes instructions to facilitate:
obtaining first scanning data from the plurality of array elements, wherein the first scanning data is generated by the radio frequency detector of each array element of the plurality of array elements;
analyzing the first scanning data from the plurality of array elements to determine a location of a first object in a space having an outer boundary, and to determine a volume and density of a selected portion of the first object, wherein the array defines a cooking volume;
determining an energy required to bring the selected portion of the first object to a target temperature according to the volume and density that is determined;
directing the beam steering processor to control radio frequency emitters of selected array elements to perform radio frequency thermal excitation of the selected portion of the first object according to the energy required by causing interference of waves emitted from the respective radio frequency emitters, wherein the first object comprises a container portion for containing the selected portion, and wherein the radio frequency emitters of the selected array elements avoid radio frequency thermal excitation of the container portion;
obtaining thermal signals from the plurality of array elements, wherein the thermal signals are generated by the thermal imaging sensor of each array element of the plurality of array elements;
analyzing thermal signals generated by thermal imaging sensors of the plurality of array elements to obtain a thermal image of the selected portion;
adjusting the radio frequency thermal excitation in accordance with the thermal image; and
analyzing second scanning data from the plurality of array elements to detect movement of a second object corresponding to an intrusion into the cooking volume while the radio frequency thermal excitation is performed.

10. The cooking device of claim 9, wherein the first object comprises a metal portion.

11. The cooking device of claim 10, wherein the cooking controller further executes instructions to facilitate directing a beam steering processor to steer around the metal portion so that the radio frequency emitters of the selected array elements are controlled to avoid irradiation of the metal portion while performing the radio frequency thermal excitation of the selected portion.

12. The cooking device of claim 9, wherein radio frequency scanning data is generated by the radio frequency detector of each array element of the plurality of array elements.

13. The cooking device of claim 9, wherein the cooking controller further facilitates detecting the movement of the second object by analysis that comprises sensing Doppler shifts in a frequency of a reflected signal.

14. A cooking device comprising:
a cooking controller;
a beam steering processor; and
an array including a plurality of array elements each comprising:
 a radio frequency emitter;
 a radio frequency detector; and
 a thermal imaging sensor;
wherein each array element is individually addressable and controllable by the cooking controller, wherein the array defines a cooking volume, and wherein the cooking controller executes instructions to facilitate:
analyzing first scanning data generated by the plurality of array elements to determine a volume and density of a selected portion of a first object;
determining an energy required to bring the selected portion of the first object to a target temperature according to the volume and density that is determined;
directing the beam steering processor to control radio frequency emitters of selected array elements to perform radio frequency thermal excitation of the selected portion of the first object in a space having an outer boundary by causing interference of waves emitted from the respective radio frequency emitters, wherein the first object comprises a container portion for containing the selected portion, and wherein the radio frequency emitters of the selected array elements avoid radio frequency thermal excitation of the container portion;
obtaining thermal signals from the plurality of array elements, wherein the thermal signals are generated by the thermal imaging sensor of each array element of the plurality of array elements;
analyzing thermal signals generated by thermal imaging sensors of the plurality of array elements to obtain a thermal image of the selected portion;
adjusting the radio frequency thermal excitation in accordance with the thermal image,
obtaining first scanning data from the plurality of array elements, wherein the first scanning data is generated by the radio frequency detector of each array element of the plurality of array elements; and
analyzing first scanning data from the plurality of array elements to detect movement of a second object corresponding to an intrusion into the cooking volume while the radio frequency thermal excitation is performed.

15. The cooking device of claim 14, wherein the cooking controller further facilitates analyzing second scanning data from the plurality of array elements to determine a location of the first object, wherein the second scanning data is generated by the radio frequency detector of each array element of the plurality of array elements.

16. The cooking device of claim 14, wherein the cooking controller further facilitates determining a location of the selected portion by analyzing radio frequency scanning data obtained from the plurality of array elements.

17. The cooking device of claim 16, wherein the radio frequency scanning data is generated by the radio frequency detector of each array element of the plurality of array elements.

18. The cooking device of claim 14, wherein the first object further comprises a metal portion, and wherein the cooking controller further executes instructions to facilitate directing a beam steering processor to steer around the metal portion so that the radio frequency emitters of the selected array elements are controlled to avoid irradiation of the metal portion while performing the radio frequency thermal excitation of the selected portion.

* * * * *